Feb. 28, 1928.
G. L. TULLY
EYE PROTECTOR
Filed May 28, 1925
1,660,587
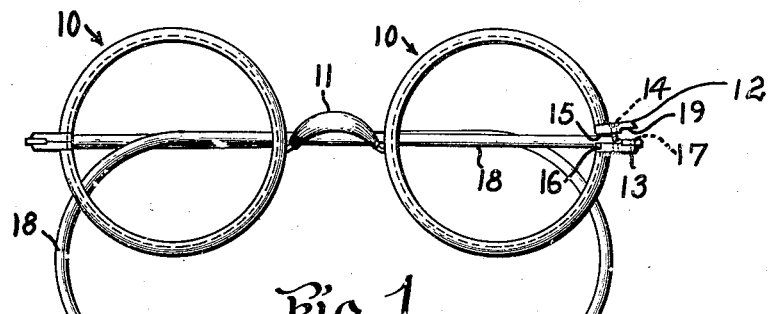
Fig. 1.
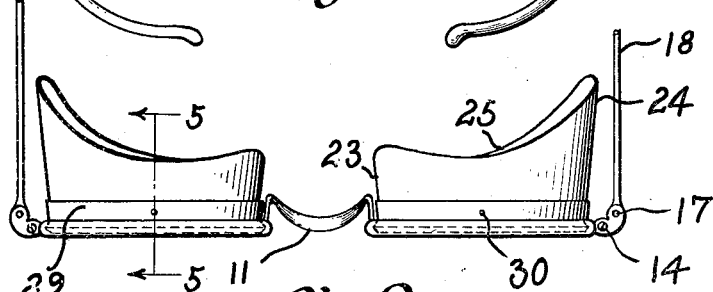
Fig. 2.
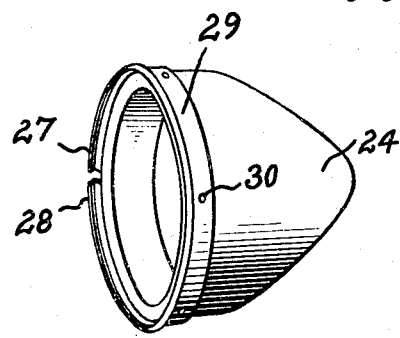
Fig. 3.
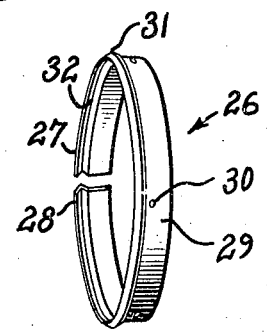
Fig. 4.
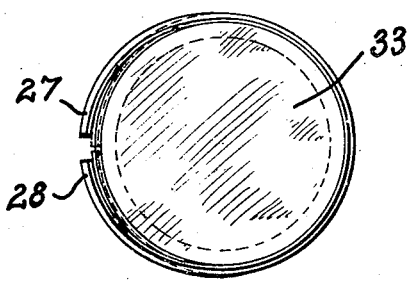
Fig. 6.
Fig. 5.
Inventor
George L. Tully.
By Harry H. Styll.
Attorney Patented Feb. 28, 1928.

1,660,587

UNITED STATES PATENT OFFICE.

GEORGE L. TULLY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE PROTECTOR.

Application filed May 28, 1925. Serial No. 33,435.

This invention relates to goggles and more particularly to that type of goggle employed for protecting the eye following an operation.

After an operation, it is very essential that the eye be well protected, not only from dirt, dust, and the like, but also against any accidental blow, for should the eye be hurt in any way or should dirt or dust be permitted to reach the same, infection thereof may occur and this might result in seriously affecting the sight of the eye and the general health and comfort of the patient. While it is very essential that the eye be well protected, it is equally desirable that this be accomplished in such a manner that the light, because of its great healing properties, will at the same time not be prevented from reaching it.

Prior to the present invention, it has been customary to protect the eye simply by means of a pad which was held directly against it by means of an elastic band or the like passing around the patient's head. This pad however not only fails to protect the eye from bearing the brunt of the force of any accidental blow, but is also very unsanitary and apt to cause the infection thereof. It also prevents any light from reaching the eye, so that with this type of protector, the time taken for the healing of the eye is somewhat more prolonged than when a protector is used, which while thoroughly protecting the eye will still permit light to reach it.

It is, therefore, one of the primary objects of the present invention to provide a goggle for use in protecting the eye, especially following an operation, and which will thoroughly and efficiently prevent any dust, dirt, or the like, from coming into contact therewith.

Another object of the invention is to provide an eye protector in the form of a goggle which projects outwardly and away from the eye so that the eye will not be subjected to the jar or receive the brunt of the force of any accidental blow.

Another object of the invention is to provide an eye protecting goggle of such a construction that while it will prevent foreign matter from coming into contact with the eye, it will at the same time, permit light to reach it.

Another object of the invention is to provide a new and improved type of eye cup which may be used in connection with any ordinary type of spectacle.

Another object is to so construct the eye cup that it may be readily and easily inserted within an eye piece or removed therefrom.

Another object is to provide an eye cup arranged to carry a lens and in which the same may be easily and quickly inserted or removed.

Another object is to provide an eye cup of simplified construction, light of weight and inexpensive to manufacture.

Other objects and advantages of the invention together with details of construction of the same will readily become apparent during the course of the following description when taken in connection with the accompanying drawings.

In the drawings forming part of this application and in which like numerals have been employed to designate corresponding parts throughout the following view, Figure 1 is a front elevation of a spectacle of well known construction.

Figure 2 is a top plan view of the spectacle with a pair of eye cups constructed in accordance with the present invention inserted within the eye pieces thereof.

Figure 3 is a perspective view of a complete eye cup. Figure 4 is a perspective view of the retaining band which is secured to the eye cup.

Figure 5 is a sectional view taken on line 5—5 of Figure 2.

Figure 6 is a front elevation of a complete eye cup.

Referring more particularly to the accompanying drawings wherein there has been disclosed a preferred embodiment of the present invention, the numeral 10 designates a pair of eye pieces connected by the bridge 11, each eye piece being split and having the two end pieces 12 and 13. A screw or fastener 14 mounted to turn in the end piece 12 and having threaded engagement with the end piece 13 serves to hold the abutting portions 15 and 16 on the respective end pieces 12 and 13 in engagement. A pivot fastener 17 is secured within the end piece 13 and receives the inner end of the temple 18, the end piece 12 being recessed as at 19, which recessed portion bears against the temple when said end pieces are clamped together whereby to retain the same in position. In the present instance, each eye piece comprises a metal rim 20 having a circumferential groove 21 in its inner periphery and having its outer side covered with zylonite or the like 22. The type of spectacle herein above described and illustrated in the drawing, is well known in the art and has been referred to simply to more clearly illustrate the present invention and it will be understood that the invention may be used just as effectively in connection with other spectacles of various constructions.

Tre present invention relates primarily to new and novel means employed for retaining an eye cup or protector within the eye piece of a spectacle of standard make and will now be referred to in detail.

The eye cup or protector is of tubular formation and is preferably made from clear zylonite or the like and comprises in its construction, a relatively narrow portion 23 having the rearwardly extending portion 24, the inner edge 25 of said cup being of such a curvature that it will snugly fit the face of the wearer and protect the eye from all sides.

The numeral 26 designates generally a metal band being separated at one point to form the separated ends 27 and 28, said band having a substantially wide surface 29 which is secured by means of rivets or the like 30 to the outer edge of the eye cup as is clearly shown in Figure 3. The band 26 extends outwardly a slight distance beyond the edge of said eye cup and is provided with a circumferential rib 31, forming a resultant groove 32 which is adapted to receive therein a lens 33. It will be noted by referring to Figure 6 that while the band 26 completely encircles the eye cup, it is not secured thereto throughout its entire circumference, but instead, the separated ends 27 and 28 thereof are normally sprung slightly away from said cup and this construction is employed in order that the lens 33 may be more readily and quickly inserted within or removed from the groove 32, prior to the positioning of the cup within the eye piece. Thus when it is is desired to mount the eye cup within the rim 20, the fastening screw 14 is first loosened so that the separated ends 15 and 16 of the eye piece will spring slightly apart, in order to facilitate the mounting of the eye cup therein. A lens is then inserted within the groove 32 of the band 26, and the separated ends 27 and 28 thereof compressed to assume the position shown by the dotted lines to Figure 6, after which the entire cup is mounted within the rim 20 by inserting the rib 31 of the band 26 within the groove 21. The fastening screw 14 is tightened and the cup securely held in place relative to the eye piece.

From the above it will be seen that there has been provided an eye protector which is extremely simple in its construction, thoroughly practical and efficient in the protection of the eye and which may furthermore be used in connection with any type of spectacle as long as the spectacle is provided with an eye piece having a lens receiving groove.

This particular construction of an eye cup is very desirable not only because of its simplicity, but also because of its great utility. That is to say, if the patient has worn spectacles prior to his operation, it is only necessary for him to purchase one or more eye cups as may be necessary, remove the lens from the eye piece and position an eye cup therein. After his eye has become well, he can remove the protector and reinsert his old lens or one ground to another prescription as may be found necessary. Again, in the event that it is necessary for him to go to the expense of purchasing both the frame and an eye cup, it will be possible for him to make use of the frames after his eye has become well, should it be found necessary that he wear glasses.

It will, of course, be understood that in the commercial production of these eye protectors, it may be found necessary to make slight changes in the specific details of construction and the right is hereby reserved to make such changes so long as they may fall within the scope of the appended claims.

What is claimed is:

1. In a device of the character described, a pair of lens rims having split end pieces and a lens groove, a bridge connecting the rims, screw means for securing the split ends together, a split ring in each lens rim having a lens groove and an extending flange therefrom, the lens groove fitting in the lens groove of the lens rim, and an eye cup having a portion secured to the extending flange of each split ring.

2. In a device of the character described, a pair of lens rims having split end pieces and a lens groove, a bridge connecting the rims, screw means for securing the split ends together, a split ring in each lens rim having a lens groove and an extending flange therefrom, the lens groove fitting in the lens groove of the lens rim, and an eye cup having a portion secured to the extending flange of each split ring at points removed from the split portion of the ring.

GEORGE L. TULLY.